United States Patent
Eshghi et al.

(10) Patent No.: US 8,375,182 B2
(45) Date of Patent: Feb. 12, 2013

(54) SYSTEM AND METHOD FOR SEGMENTING A DATA STREAM

(75) Inventors: Kave Eshghi, Los Altos, CA (US); Mark David Lillibridge, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 12/368,784

(22) Filed: Feb. 10, 2009

(65) Prior Publication Data

US 2010/0205163 A1    Aug. 12, 2010

(51) Int. Cl.
*G06F 12/16* (2006.01)
(52) U.S. Cl. ............... 711/162; 711/216; 711/E12.018
(58) Field of Classification Search .............. 711/216, 711/E12.018
See application file for complete search history.

(56) References Cited

U.S. PATENT DOCUMENTS

| | | | |
|---|---|---|---|
| 5,638,509 A | 6/1997 | Dunphy | |
| 5,990,810 A | 11/1999 | Williams | |
| 6,513,050 B1 | 1/2003 | Williams | |
| 6,839,680 B1 | 1/2005 | Liu et al. | |
| 6,938,005 B2 | 8/2005 | Iverson | |
| 6,961,009 B2 | 11/2005 | McCanne | |
| 7,082,548 B2 | 7/2006 | Nakano | |
| 7,269,689 B2 | 9/2007 | Eshghi | |
| 7,734,603 B1 * | 6/2010 | McManis | 707/696 |
| 2001/0010070 A1 | 7/2001 | Crockett | |
| 2002/0156912 A1 | 10/2002 | Hurst | |
| 2003/0101449 A1 | 5/2003 | Bentolila | |
| 2003/0140051 A1 | 7/2003 | Fujiwara | |
| 2004/0162953 A1 | 8/2004 | Yoshida | |
| 2005/0091234 A1 | 4/2005 | Hsu | |
| 2006/0059173 A1 | 3/2006 | Hirsch et al. | |
| 2006/0059207 A1 | 3/2006 | Hirsch et al. | |
| 2006/0293859 A1 | 12/2006 | Pipke | |
| 2007/0220197 A1 | 9/2007 | Lasser | |

(Continued)

FOREIGN PATENT DOCUMENTS

| | | |
|---|---|---|
| WO | 2006030326 A1 | 3/2006 |
| WO | 2006094365 A1 | 9/2006 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002.

(Continued)

*Primary Examiner* — Kevin Verbrugge

(57) ABSTRACT

A method of limiting redundant storage of data comprises receiving a data stream and partitioning the data stream into a series of data chunks. At least one content hash value for a set of data chunks is generated based on data content of the set of data chunks. One or more data chunks are grouped into a segment with at least one boundary of the segment defined based on an evaluation of content hash values of data chunks. Content hash values of data chunks of the segment are compared to content hash values of data chunks of segments stored on a backup mass storage device. A pointer to a stored data chunk of an existing segment is stored on the backup mass storage device if a content hash value of a data chunk of the segment matches the content hash value of the stored data chunk.

15 Claims, 2 Drawing Sheets

U.S. PATENT DOCUMENTS

| | | | |
|---|---|---|---|
| 2007/0250519 A1 | 10/2007 | Fineberg | |
| 2007/0250670 A1 | 10/2007 | Fineberg | |
| 2007/0255758 A1 | 11/2007 | Zheng et al. | |
| 2008/0126176 A1 | 5/2008 | Iguchi | |
| 2008/0270436 A1* | 10/2008 | Fineberg et al. | 707/101 |
| 2008/0294696 A1 | 11/2008 | Frandzel | |
| 2009/0037499 A1* | 2/2009 | Muthulingam et al. | 707/205 |
| 2009/0043983 A1* | 2/2009 | Yagawa | 711/170 |
| 2009/0112945 A1 | 4/2009 | Camble | |
| 2009/0112946 A1 | 4/2009 | Jones | |
| 2009/0113167 A1 | 4/2009 | Camble | |
| 2010/0198792 A1 | 8/2010 | Camble | |
| 2010/0198832 A1 | 8/2010 | Jones | |
| 2010/0235372 A1 | 9/2010 | Camble | |
| 2010/0235485 A1 | 9/2010 | Lillibridge | |
| 2010/0246709 A1 | 9/2010 | Lillibridge | |
| 2010/0280997 A1 | 11/2010 | Lillibridge | |
| 2010/0281077 A1 | 11/2010 | Lillibridge | |
| 2011/0040763 A1 | 2/2011 | Lillibridge | |
| 2011/0099351 A1* | 4/2011 | Condict | 711/216 |

FOREIGN PATENT DOCUMENTS

| | | |
|---|---|---|
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | 2009131585 A1 | 10/2009 |

OTHER PUBLICATIONS

Shahabi et al.; "Yoda an Accurate and Scalable Web based Recommendation System?" University of Southern California, Los Angeles, Sep. 2001.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

Muthitacharoen Athicha, et al., "A Low-Bandwidth Network File System," Proceedings of the 18th ACM Symposium on Operating Systems Principles (SOSP '01), Oct. 2001.

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005. ICDE 2005. Proceedings. 21st. intl Conf on Tokyo, Japan, Apr. 5-8, 2005, p. 12.

Eshghi et al., "Jumbo Store: Providing Efficient Incremental Upload and Versioning for a Utility Rendering Service," 2007 (16 pages).

Brin, Sergey, et al., "Detection Mechanisms for Digital Documents", Department of Computer Science, Stanford University, Oct. 31, 1994, p. 1-12.

Manber, Udi, "Finding Similar Files in a Large File System," Department of Computer Science, University of Arizona, TR 93-33, Oct. 1993, (11 pages).

Rabin, M.O., "Fingerprinting by Random Polynomials," Technical Report, Center for Research in Computing Technology, Harvard University, 1981, Report TR-15-81 (14 pages).

Fenstermacher et al.; "Mining Client-Side Activity for Personalization" Department of Management Information Systems, Eller College of Business and Public Administration, University of Arizona, Jun. 2002 (8 pages).

Baoyao, Zhou; ""Intelligent Web Usage Mining"" Nanyang Technological University, Division of Information Systems, School of Computer Engineering, Jul. 2004 (94 pages).

Andrejko et al.: User Characteristics Acquisition from Logs with Semantics, Slovak University of Technology in Bratislava, Mar. 2007 (8 pages).

Hongjun Lu et al: Extending a Web Browser with Client-Side Mining, Hong Kong University of Science and Technology Department of Computer Science, Clear Water Bay, Kowloon, Hong Kong, China, Apr. 2003 (12 pages).

Sendhikumar et al.; "Personalized ontology for web search personalization," Proceedings of 1st Bangalore Annual Compute Conference, Compute 2008, Jan. 2008 (7 pages).

Shahabi et al.; "Yoda an Accurate and Scalable Web based Recommendation System?" University of Southern California, Los Angeles, Sep. 2001 (14 pages).

Claypool et al.; "Implicit Interest Indicators", Worcester Polytechnic Institute, Worcester, Computer Science Department Worcester Polytechnic Institute Worcester, MA 01609, USA., Jan. 2001 (8 pages).

Shahabi et al.; "A Framework for Efficient and Anonymous Web Usage Mining Based on Client-Side Tracking," University of Southern California, Los Angeles, Sep. 2001 (48 pages).

\* cited by examiner

SYSTEM AND METHOD FOR SEGMENTING A DATA STREAM

BACKGROUND

In many traditional computer data storage applications, magnetic tape has been used for data backup. However, tape is a sequential access device. While its streaming bandwidth is high once the head is at the right point and the tape is moving at full speed, the "set up" time is long.

With the explosion in disk capacity, it is now affordable to use hard disks for data backup. Hard disks, of course, are random access and can significantly speed up backup and restore operations. Accordingly, disk-to-disk backup (D2D) has become the preferred backup option for organizations. Backed-up data typically has massive redundancy, because a large proportion of data does not generally change between backup sessions. De-duplication removes this redundancy by storing duplicate data only once, and this increases the effective capacity of the storage device.

Thus, de-duplication has become an essential feature of disk-to-disk backup solutions. Chunk-based de-duplication is a well known de-duplication technique. In this approach, data to be de-duplicated is broken into chunks, and incoming chunks are compared with the chunks already in the store by hash comparison. Only chunks that are not already in the store are backed up, and duplicate chunks are replaced with pointers to the identical, stored copies.

DETAILED DESCRIPTION

Figure 1:
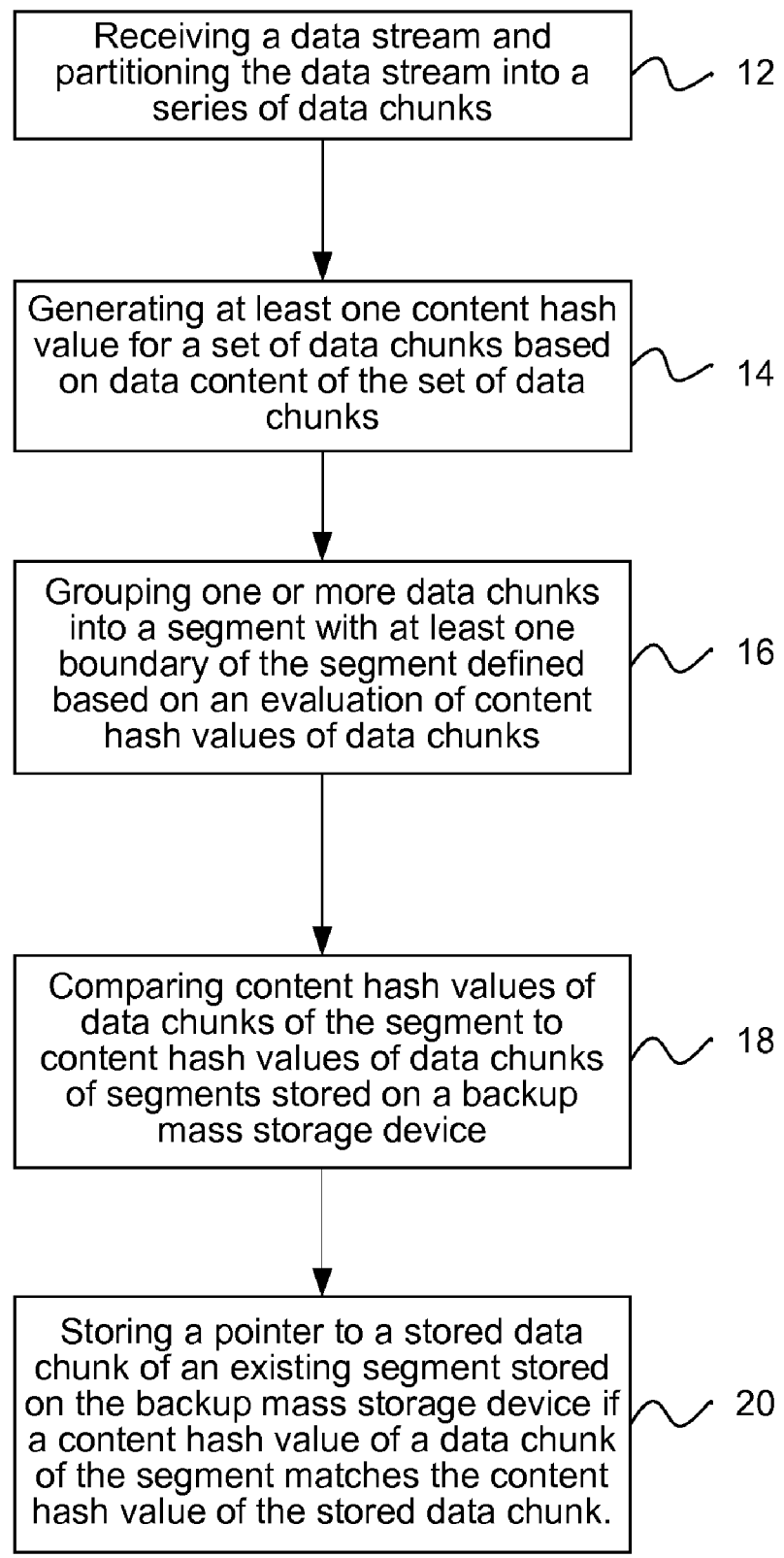
FIG. 1 is a flow chart illustrating a method of limiting redundant storage of data for a backup mass storage device in accordance with an embodiment.

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

The present invention provides systems and methods to maximize the similarity of a segment to be stored on a backup storage device with the segments that are already stored on a backup device. As used herein, the concept of similarity refers to the number of identical data chunks two segments have in common. The invention proves advantageous because when deduplication is performed by deduplicating a particular segment's data chunks against only the data chunks of a fixed small number of similar segments, more duplication can be removed. The more similar the incoming segment is to existing segments (e.g., the already stored segments), the more effective is this de-duplication process.

In-line de-duplication refers to a de-duplication process where the data is de-duplicated as it arrives, as opposed to out-of-line de-duplication where the data is first accumulated in a buffer area and is then de-duplicated in batch mode. There are various trade offs between in-line and out-of-line de-duplication: the present discussion, however, is primarily directed to the problems encountered with in-line de-duplication. In-line, chunk-based de-duplication faces what is known as the disk bottleneck: it is impractical to keep the index of all chunk hashes in RAM, and a disk-based index with one seek per hash lookup is too slow.

For the purposes of this application, we define the size of a segment to be the number of data chunks it contains and the length of a segment to be the sum of the lengths of the data chunks it contains.

Conventional systems may utilize fixed-size or fixed-length segments (i.e., each segment includes the same number of data chunks or each segment has the same length). As such, the segments encounter a "boundary shifting" problem. As an example, consider two data streams, which are identical except that the second data stream has 1000 extra chunks added at the beginning. If the two data streams are broken into fixed-size segments of 2000 chunks each, starting at the beginning of the streams, segments in the second stream will only share at most 50% of their chunks with any segment in the first stream, even though the two streams are identical except for the first 1000 chunks.

The present invention addresses this problem by utilizing content-based segmentation, in which segment boundaries are determined not by the distance from the beginning of the stream (either in terms of number of chunks or number of bytes), but by examining the values of chunk hashes. When data streams contain similar data (e.g., large portions that are exactly the same), the resulting segment in one stream is much more likely to have a corresponding segment in the other stream that is identical.

As a general rule, while hashing techniques are utilized throughout the present system and method, the specific types of hashing techniques utilized can vary. As one non-limiting example, an MD5 hash function has been found to be effective when utilized with the present invention. However, those of ordinary skill in the art, having possession of this disclosure, could readily incorporate a variety of other known hash functions with the present invention. Also, data chunks can be defined in a variety of ways, and can be variable-length data chunks, or the data chunks can be defined to have the same length.

Accordingly, as used herein, the term "hash function" is to be understood to refer to any well-defined procedure, mathematical function, or deterministic function that converts a large, possibly variable-sized amount of data into a small datum. Further, various systems and methods discussed herein can utilize multiple hash functions that differ one from another, even when used with the same data or in the same process. For example, one hash function might be used to define a segment boundary, while a second hash function is used to evaluate whether or not the data contained in the segment matches or corresponds to data already stored in another location.

In one aspect of the invention, the only limitation that can be placed on the hash function is that it will generally relate to the data content of a data chunk in a way that goes beyond simply depending on the length of that data chunk. For every nonzero chunk length, there should exist two different data chunks (e.g., contain different bytes) of that length that the hash function gives different results for. A hash function that simply returns the length of a data chunk, or the number of bytes in that data chunk, is not considered within the definition of a hash function, as that term is used herein.

As shown generally in FIG. 1, in accordance with one embodiment, a method of limiting redundant storage of data for a backup mass storage device is provided. The method can include, at block 12, receiving a data stream from, in one example, a mass storage device or similar device, and partitioning the data stream into a series of data chunks. At block

14, a content hash value for a set of data chunks can be generated based on data content of the set of data chunks. As used herein, the term "set" of data chunks can refer to multiple data chunks or a single data chunk. In one embodiment, generating content hash value(s) for the set of data chunks can include processing the content of the chunks through a hash function to provide a content related hash value. At block 16, one or more data chunks can be grouped with at least one boundary of the segment defined based on an evaluation of content hash values of data chunks. At block 18, hash values of chunks in the segment can be compared to hash values of data chunks in segments stored on a backup mass storage device. At block 20, if a hash value of a data chunk of the segment matches the hash value of the stored data chunk, a pointer is stored that points to a stored data chunk of an existing segment already stored on the mass storage device.

If a content hash value of the data chunk of the segment does not match content hash values of data chunks of existing segments stored on the mass storage device, the data chunk of the target segment can be stored on the backup mass storage device.

Defining the boundary of the segments can be accomplished in a number of ways, examples of which are provided below. In the examples provided below, the following considerations apply: a data stream is considered to be formed of N chunks, denoted $C_0, C_1, \ldots, C_{N-1}$. The position i denotes the position just before chunk $C_i$. Thus, the first position (before any chunks) is 0, the position after the first chunk is 1, and the last position (after all chunks) is N. The notation h[i] is utilized to denote the hash value of the $(i+1)^{th}$ chunk in the stream, $C_i$. The C programming language notation u % v is utilized to denote the remainder operation: for example 10% 3==1. In examples 1-3 below, only the chunk hashes are used when defining segment boundaries. Essentially, then, the stream of chunks can be partitioned into segments by the backup storage system using only a stream of the chunks' hashes. When reference is made herein to placing a boundary at a particular data chunk, a given embodiment can always place that boundary before that chunk, always place that boundary after that chunk, or some combination of the two.

In one embodiment, defining at least one boundary of a segment can be done by selecting a desired average segment size and defining a boundary of a segment at a chunk of data if performing some manipulation of a hash value of the data contents of that chunk of data returns a predetermined or desired or targeted value. In one aspect, the manipulation of the hash value can include applying a deterministic function to it. In one non-limiting example, a desired average segment size can be selected and a boundary of a segment can be defined at a chunk of data if computing the integer remainder of the hash value of that chunk of data modulo the desired average segment size returns zero. A similar check can be performed using other predetermined values—it is not necessary that zero be selected as the desired value: any integer between zero and the desired average segment size can be used. It is also not necessary that the deterministic function utilized be the remainder function example outlined above: for example, we could consider the hash value to be a polynomial, and use polynomial division with a predetermined polynomial, where the output of the function is the polynomial remainder, and we look for a pre-determined polynomial to be the remainder. One exemplary, non-limiting method that can be utilized to accomplish this result is included below.

Method 1: For a desired average segment size of A, a position i in the stream is a segment boundary iff h[i]% A=0, I=0, or I=N.

By utilizing this method, segment boundaries are determined by content-derived hashes: as such, the so-called boundary shifting problem does not arise. For example, in the situation described above, assuming an average segment size of 2000, most probably only the first group of segments of the two streams would be different, and all other segments would be the same.

While Method 1 has proved to be effective, there can be a slight disadvantage to using this Method. Even though the desired average segment size is given by A, the individual segment sizes may vary greatly. This can, in certain applications, reduce the effectiveness of a segment based de-duplication scheme. In one embodiment of the invention, this issue can be addressed by defining at least one boundary of the segment by first selecting: a divisor; a desired minimum segment size, and a desired maximum segment size. The at least one boundary of the segment can be defined at a chunk of data if: dividing the hash of the chunk of data by the divisor returns an integer, if a size of the segment is not less than the minimum segment size, and if the size of the segment is not greater than the maximum segment size.

In another aspect of the invention, defining at least one boundary of the segment can be accomplished by selecting a desired average segment size and defining a boundary of the segment at a chunk of data that is nearest to an established boundary of the segment measured in a predetermined direction, wherein the chunk of data yields a predetermined result when a deterministic function is applied to a content hash of the chunk of data. The closest chunk of data that meets the condition may be chosen.

The following Method 2 represents one non-limiting example of a manner in which the above segmentation can be accomplished:

Method 2: choose three numbers M, A, X where M<A<X. M is the minimum segment size, A is the divisor, and X is the maximum segment size. The segment boundaries besides 0 and N are found using the following:

```
int p=0; //p holds the position of the previous boundary
for (int i=0; i<N; i++) {
    if ( (i-p>M && h[i] % A==0) || i-p==X) {
        <define i as the next segment boundary>;
        p=i;
    }
}
```

As will be appreciated, the selection of M, A, and X in the above formula will affect the outcome of the process. The present inventors have found that there are theoretical as well as experimental results showing the best choice of M, A, and X for a given desired average segment size. In one example embodiment, for an average segment size of K, the values of M=0.25 K, A=0.76 K and X=8 K have been found to give good results. Use of Algorithm 2 can produce results more desirable than those obtained by Algorithm 1, as the variance of segment size is not so great. However, it can be seen that the maximum segment size can be as great as eight times the average segment size.

In a further embodiment, defining at least one boundary of a segment can include first selecting: a first divisor, a second divisor B, a desired minimum segment size M, and a desired maximum segment size X. Let D be the position of the last segment boundary in the sequence. The next segment boundary is then defined as follows: If D+M is larger than or equal to the position at the end of the sequence (N), we are finished. Otherwise, scanning of the sequence is begun at a position D+M, and, at each position k, the value h[k]% A is computed and if it is equal to 0, we say there is an A-Match at k. h[k]% B is also computed and if it returns 0, we say there is a B-match at k.

Scanning continues until an A-Match is found, or until position D+X or N is reached, whichever occurs first. If an A-match is found before reaching the position D+X, then that position is designated as the next segment boundary. If an A-match is not found before reaching the D+X, but position D+X was reached and at least one B-match was found, the position resulting in the latest B-match is designated as the next segment boundary. If no A-match or B-match is found and position D+X is reached, the position D+X is designated as the next segment boundary.

The following Method 3 is one non-limiting example by which the above method can be executed:

Method 3: choose 4 numbers M, B, A, X where M<B<A<X. Again, M is the minimum segment size, X is the maximum segment size, and B and A are divisors. Find the segment boundaries besides 0 and N using the following pseudo code:

```
int p=0, q=0;
for (int i=0; i<N; i++) {
    if (i-p<=M) {
        continue;
    }
    if (h[i] % B == 0) {
        q=i;
    }
    if (h[i]% A == 0) {
        <define i as the next segment boundary>;
        p=i;
        q=0;
        continue;
    }
    if (i-p == X) {
        if (q != 0) {
            <define q as the next segment boundary>;
            p=q;
            q=0;
        } else {
            <define i as the next segment boundary>;
            p=i;
            q=0;
        }
    }
}
```

The values of M, B, A, and X can vary. In one example embodiment, however, the inventors have found that for average segment size of K, the values of M=0.45 K, B=0.27 K, A=0.53 K and X=2.76 K give good results. Algorithm 3 has been found to perform well as the maximum segment size is only 2.76 times the average segment size and the minimum segment size is 0.45 times the average segment size, thus greatly reducing the segment size variability.

In a further embodiment, a segment from an original non-chunked data stream can be formed (using a content based chunking algorithm such as TTTD (Two Threshold Two Divisor)) with the desired average segment length, and then a segment can be chunked using a chunking algorithm with a smaller average chunk length. While this process has proved effective, it involves chunking data twice, leading to inefficiencies. Moreover, the segment boundaries are not guaranteed to be chunk boundaries of the original stream.

Figure 2:
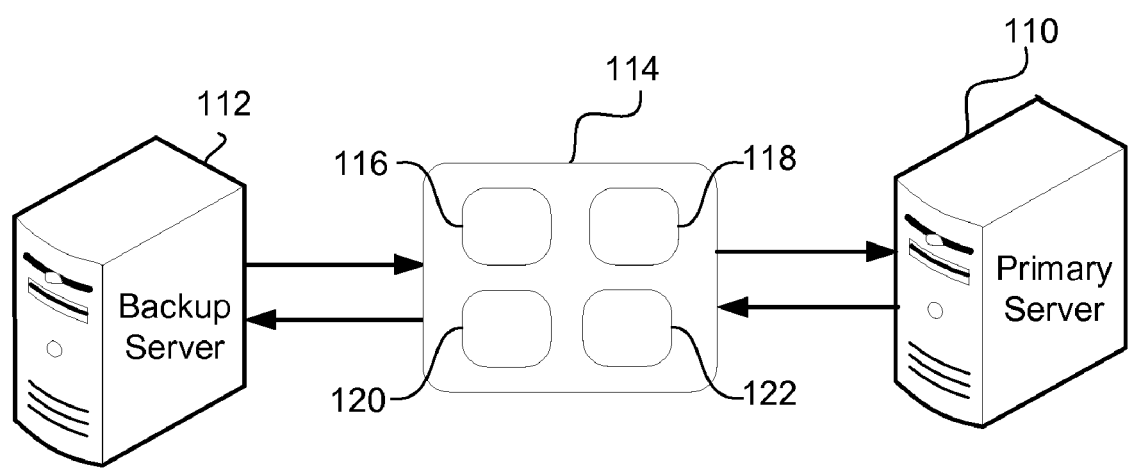
FIG. 2 is a schematic representation of a system for limiting redundant storage of data for a backup mass storage device in accordance with an embodiment of the invention.

The methods of the present invention can be carried out using a variety of devices. In one embodiment, as shown by example in FIG. 2, a system for limiting redundant storage of data to a backup mass storage device can be provided that includes a mass storage device (in one example a primary server 110) and a backup mass storage device (in one example, a backup server 112).

A series of modules (shown schematically at 114 combined as a single unit) can perform various functions. A backup module 116 can be operable to receive a data stream from the mass storage device 110 and to transmit a modified data stream to the backup mass storage device 112. A hash generating module 118 can be operable to generate at least one content hash value for a set of data chunks based on data content of the set of data chunks. A segmentation module 120 can be operable to group a plurality of data chunks into a segment while defining at least one boundary of the segment based on an evaluation of the hash values of the data chunks. A comparison module 122 can be operable to compare hash values of data chunks of the segment to hash values of data chunks of segments stored on the backup mass storage device.

The system can be operable to store a pointer to a stored data chunk of an existing segment stored on the mass storage device if a hash value of a data chunk of the segment matches the hash value of the stored data chunk; and to store a data chunk of the segment on the backup mass storage device if the hash value of the data chunk of the segment does not match hash values of data chunks of existing segments stored on the mass storage device.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of limiting redundant storage of data for a backup mass storage device, comprising:
   receiving a data stream;
   partitioning the data stream into a series of data chunks;
   generating at least one content hash value for a set of data chunks based on data content of the set of data chunks;
   grouping a plurality of data chunks into a particular segment with at least one boundary of the particular segment defined based on an evaluation of content hash values of data chunks;
   comparing content hash values of data chunks of the particular segment to content hash values of data chunks of a plurality of segments stored on a backup mass storage device; and
   storing a pointer to a stored data chunk of an existing segment of the plurality of segments stored on the backup mass storage device if a content hash value of a data chunk of the particular segment matches the content hash value of the stored data chunk.

2. The method of claim 1, further comprising storing a data chunk of the particular segment on the backup mass storage device if a content hash value of the data chunk of the particular segment does not match content hash values of data chunks of the plurality of segments stored on the mass backup storage device.

3. The method of claim 1, wherein partitioning the data stream into a series of data chunks comprises partitioning the data stream into a series of variable-length data chunks.

4. The method of claim 1, wherein a hash function utilized to define one or more segment boundaries corresponds to a hash function utilized to compare data content of data chunks of the particular segment to data content of stored data chunks.

5. The method of claim 1, wherein defining at least one boundary of the particular segment further comprises:
   selecting a desired average segment size; and
   defining a boundary of the particular segment at a chunk of data where applying a deterministic function to a content hash of the chunk of data and the desired average segment size returns a predetermined result.

6. The method of claim 1, wherein defining at least one boundary of the particular segment further comprises:
   selecting a desired average segment size; and
   defining a boundary of the particular segment at a chunk of data that is nearest to an established boundary of the particular segment measured in a predetermined direction, wherein a predetermined result is produced when a deterministic function is applied to a content hash of the chunk of data and the desired average segment size.

7. A system for limiting redundant storage of data to a backup mass storage device, comprising:
   a mass storage device;
   a backup mass storage device;
   a backup module, operable to receive a data stream from the mass storage device and to transmit a modified data stream to the backup mass storage device;
   a hash generating module, operable to generate at least one content hash value for a set of data chunks based on data content of the set of data chunks;
   a segmentation module, operable to group a plurality of data chunks into a particular segment while defining at least one boundary of the particular segment based on an evaluation of content hash values of data chunks; and
   a comparison module, operable to compare content hash values of data chunks of the particular segment to content hash values of data chunks of a plurality of segments stored on the backup mass storage device;
   the backup module operable to store a pointer to a stored data chunk of an existing segment of the plurality of segments stored on the mass storage device if a content hash value of a data chunk of the particular segment matches the content hash value of the stored data chunk.

8. The system of claim 7, wherein the backup module is operable to store a data chunk of the particular segment on the backup mass storage device if the content hash value of the data chunk of the particular segment does not match content hash values of data chunks of the plurality of segments stored on the mass storage device.

9. The system of claim 7, wherein the segmentation module is operable to define at least one boundary of the particular segment by:
   identifying a desired average segment size; and
   defining a boundary of the particular segment at a chunk of data where applying a deterministic function to the content hash of the chunk of data and the desired average segment size returns a predetermined result.

10. The system of claim 7, wherein the segmentation module is operable to define at least one boundary of the particular segment by:
   identifying a desired average segment size; and
   defining a boundary of the particular segment at a chunk of data that is nearest to an established boundary of the particular segment measured in a predetermined direction, wherein a predetermined result is produced when a deterministic function is applied to a content hash of the chunk of data and the desired average segment size.

11. The system of claim 7, wherein the segmentation module is operable to define at least one boundary of the particular segment by:
   identifying a desired minimum segment size and a desired maximum segment size; and
   defining a boundary of the particular segment at a chunk of data where: applying a deterministic function to the content hash of the chunk of data returns a predetermined result, a size of the particular segment is not less than the minimum segment size, and the size of the particular segment is not greater than the maximum segment size.

12. The system of claim 11, wherein an average segment size "K" is defined, the minimum segment size is between about 0.2*K and about 0.3*K, and the maximum segment size is between about 4*K and about 10*K.

13. The system of claim 7, wherein the segmentation module is operable to define at least one boundary of the particular segment by:
   identifying: a divisor, a desired minimum segment size, and a desired maximum segment size; and
   defining a boundary of the particular segment at a chunk of data where: dividing a content hash of the chunk of data by the divisor returns an integer, a size of the particular segment is not less than the minimum segment size, and the size of the particular segment is not greater than the maximum segment size.

14. The system of claim 7, wherein a hash function utilized to define segment boundaries corresponds to a hash function utilized to compare data content of data chunks of the particular segment to data content of stored data chunks.

15. The system of claim 7, wherein the segmentation module is operable to partitioning the data stream into a series of variable-length data chunks.

* * * * *